(12) United States Patent
Kilian et al.

(10) Patent No.: US 10,733,203 B2
(45) Date of Patent: Aug. 4, 2020

(54) METHOD AND SYSTEM FOR THE DISTRIBUTED STORING OF INFORMATION IN A PLANT OF PROCESS AUTOMATION HAVING A PLURALITY OF FIELD DEVICE

(71) Applicant: Endress+Hauser GmbH+Co. KG, Maulburg (DE)

(72) Inventors: Markus Kilian, Merzhausen (DE); Andrea Seger, Zell (DE); Bert Von Stein, Zell (DE); Christian Wandrei, Weil am Rhein (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 157 days.

(21) Appl. No.: 15/715,393

(22) Filed: Sep. 26, 2017

(65) Prior Publication Data
US 2018/0089231 A1 Mar. 29, 2018

(30) Foreign Application Priority Data
Sep. 27, 2016 (DE) .......................... 10 2016118 269

(51) Int. Cl.
*G06F 16/00* (2019.01)
*G06F 16/27* (2019.01)
(Continued)

(52) U.S. Cl.
CPC .......... *G06F 16/27* (2019.01); *G05B 19/042* (2013.01); *G06F 11/1004* (2013.01);
(Continued)

(58) Field of Classification Search
CPC .. G06F 3/0619; G06F 3/0655; G06F 11/1004; G06F 11/10; G06F 11/1068;
(Continued)

(56) References Cited

U.S. PATENT DOCUMENTS 3,876,978 A   4/1975  Bossen et al.
6,738,393 B2 *  5/2004  Miki ..................... H04J 3/0608
                                               370/470

(Continued)

FOREIGN PATENT DOCUMENTS

DE   10084706 T5   7/2002

OTHER PUBLICATIONS

Search Report for German Patent Application No. 10 2016 118 269.9, German Patent Office, dated Feb. 14, 2017, 6 pp.

*Primary Examiner* — Merilyn P Nguyen
(74) *Attorney, Agent, or Firm* — Mark A. Logan; Endress+Hauser (USA) Holding Inc.

(57) ABSTRACT

The disclosure includes a method and a system for the distributed storing of information in a plant of process automation having a plurality of field devices, the method including: reading data in the form of data bit sequences, both from a first field device as well as also from at least a second field device, by a logic unit; combining at least a first data bit sequence read from the first field device with at least a second data bit sequence read from the second field device by means of an XOR function executed by the logic unit for forming a first check bit sequence, wherein in the check bit sequence each position corresponds to an XOR operation of the corresponding locations of the first and second data bit sequences; and storing the check bit sequence in a third field device.

10 Claims, 2 Drawing Sheets

(51) Int. Cl.
*G06F 16/25* (2019.01)
*G06F 11/10* (2006.01)
*G05B 19/042* (2006.01)
*G06F 11/14* (2006.01)

(52) U.S. Cl.
CPC .... *G06F 16/25* (2019.01); *G05B 2219/25428* (2013.01); *G06F 11/1446* (2013.01)

(58) Field of Classification Search
CPC .... G06F 11/108; G06F 16/25; G06F 11/1446; G06F 16/27; H03M 13/11; G05B 19/042; G05B 2219/25428
See application file for complete search history.

(56) References Cited

U.S. PATENT DOCUMENTS

| | | | | |
|---|---|---|---|---|
| 8,683,302 B2* | 3/2014 | Okamura | ............ | H03M 13/116 |
| | | | | 714/777 |
| 8,769,370 B2* | 7/2014 | Murakami | ......... | H03M 13/1154 |
| | | | | 714/701 |
| 8,918,705 B1* | 12/2014 | Tang | ................ | H03M 13/3927 |
| | | | | 714/763 |
| 9,658,921 B2* | 5/2017 | Kamali | .................... | G06F 11/10 |
| 9,818,315 B2* | 11/2017 | Hiltunen | ............. | H04W 12/003 |
| 10,009,146 B2* | 6/2018 | Shen | ...................... | H03M 13/13 |
| 10,469,212 B2* | 11/2019 | Xu | ........................ | H04L 1/0065 |
| 2010/0070822 A1* | 3/2010 | Leung | .................... | H04L 1/007 |
| | | | | 714/752 |
| 2016/0112157 A1* | 4/2016 | Li | ....................... | G06F 11/1004 |
| | | | | 714/807 |
| 2018/0069659 A1* | 3/2018 | Zhang | ................ | H03M 13/091 |
| 2018/0307555 A1* | 10/2018 | Zwart | .................. | H04L 1/0045 |

* cited by examiner

METHOD AND SYSTEM FOR THE DISTRIBUTED STORING OF INFORMATION IN A PLANT OF PROCESS AUTOMATION HAVING A PLURALITY OF FIELD DEVICE

CROSS-REFERENCE TO RELATED APPLICATION

The present application is related to and claims the priority benefit of German Patent Application No. 10 2016 118 269.9, filed on Sep. 27, 2016, the entire contents of which are incorporated herein by reference.

TECHNICAL FIELD

The present disclosure relates to a method for the distributed storing of information in a plant of process automation having a plurality of field devices. Furthermore, the present disclosure relates to a system for the distributed storing of information in a plant of process automation having a plurality of field devices.

BACKGROUND

Known from the state of the art are field devices, which are used in industrial plants. In process automation technology, same as in manufacturing automation technology, field devices are often applied. Referred to as field devices are, in principle, all devices, which are applied near to the process and which deliver, or process, process relevant information. Thus, field devices are used for registering and/or influencing process variables. Serving for registering process variables are measuring devices, i.e. sensors. These are used, for example, for pressure- and temperature measurement, conductivity measurement, flow measurement, pH measurement, fill level measurement, etc. and register the corresponding process variables, pressure, temperature, conductivity, pH-value, fill level, flow, etc. Used for influencing process variables are actuators. These involve, for example, pumps or valves, which can influence the flow of a liquid in a pipe or tube or the fill level in a container. Besides the above mentioned measuring devices and actuators, considered to be field devices are also remote I/Os, radio adapters, and, generally, devices, which are arranged at the field level.

A large number of such field devices are produced and sold by the Endress+Hauser group of firms.

In modern industrial plants, field devices are, as a rule, connected with superordinated units via communication networks, such as, for example, fieldbusses (ProfiBus®, Foundation® Fieldbus, HART®, etc.). Normally, the superordinated units are control units, such as, for example, a PLC (programmable logic controller). The superordinated units serve, among other things, for process control, as well as for start-up of the field devices. The measured values registered by the field devices, especially sensors, are transferred via a bus system to one or more superordinated units, which, in given cases, further process the measured values and forward them to the control room of the plant. The control room serves for process visualizing, process monitoring and process control via the superordinated units. Along with that, also required is data transfer from the superordinated unit via the bus system to the field devices, especially for configuration and parametering of field devices as well as for operating actuators.

Used for servicing the field devices are corresponding operating programs (operating tools), which either run on the superordinated units self-sufficiently (Endress+Hauser FieldCare, Pactware, AMS Fisher-Rosemount, PDM Siemens) or else are integrated in control room applications (Siemens PCS7, ABB Symphony, Emerson Delta V). The terminology "servicing" includes, among other things, a parametering of the field device, an updating of the field device and/or a querying and visualizing of process data and/or diagnostic data of the field device.

Before start-up and for maintenance during operation of the field device, the field device user must parameter the field device. For parametering, especially for reading and/or writing of parameters, servicing devices are applied. Such servicing devices communicate with the field device via an interface.

Field devices can have a large number of parameters. Thus, currently, a few hundred parameters is no rarity for an individual field device. In the case of failure of a field device, the parameters of a substitute field device must be set to the same parameter values as the parameter values of the field device taken out of service. For this reason, backup of the parameter values of all field devices located in a plant is very important, in order to minimize the costs- and time consumed occurring with a basic parametering of a substitute field device.

The backup of these parameter values can occur by means of various methods:
in the form of a backup file stored in a servicing device;
as a backup file in a withdrawable memory module, for example, a memory card, of the field device; and/or
as measuring point documentation in the form of a printout on paper.

Each these methods can have considerable disadvantages. For example, the backup files can get lost in the course of time. The removable memory module of the field device can be destroyed together with the field device, for example, due to a fire or a voltage spike.

SUMMARY

Given this problem, an object of the present disclosure is to provide method and system permitting secure and efficient storage of data of a plurality of field devices in a plant of process automation.

The object is achieved by a method for the distributed storing of information in a plant of process automation having a plurality of field devices, comprising:
reading data in the form of data bit sequences, both from a first field device as well as also from at least a second field device, by a logic unit;
combining at least a first data bit sequence read from the first field device with at least a second data bit sequence read from the second field device by means of an XOR function executed by the logic unit for forming a first check bit sequence, wherein in the check bit sequence each position corresponds to an XOR operation on the corresponding locations of the first and second data bit sequences; and
storing the check bit sequence in a third field device.

The great advantage of the method of the present disclosure provides that data of a field device are stored in a plurality of additional field devices. Thus, a field device possesses not only its own data, but also data of all additional field devices. Instead, however, of storing the data of all other field devices individually, the data are combined by means of an XOR function. In this way, the memory capacity required in each of the field devices is significantly reduced.

A XOR function is a logical function, in the case of which binary numbers are combined with one another according to the following logic table:

| Binary digit A | Binary digit B | A XOR B |
|---|---|---|
| 0 | 0 | 0 |
| 0 | 1 | 1 |
| 1 | 0 | 1 |
| 1 | 1 | 0 |

The XOR operation can also be calculated by addition of two binary numbers modulo 2. In this regard, one calculates the simple sum of the two numbers, divides the sum by 2 and considers, thereafter, the remainder of the division. If the sum is an even number, then the remainder is 0, if it is odd, then the remainder is one.

If the lengths of two data bit sequences to be combined differ, zeros are added to the shorter data bit sequence, until the data bit sequences have identical lengths.

For correct functioning of the method of the present disclosure, at least three field devices are required. In principle, there is no upper limit for the number of field devices participating in the method of the present disclosure. However, the effort to be provided by the logic unit rises with the number of field devices participating in the method. For this reason, it is advantageous to subdivide a large number of field devices into individual groups. In the case of group formation, it can be provided that locally neighboring field devices are placed in different groups. Thus, especially in the case of a fire, it can be prevented that more than one field device of a group is lost and the method can still be applied.

Field devices, which can be used in connection with the present disclosure, have been described, by way of example, in the introductory part of the description.

An advantageous further development of the method of the present disclosure provides that the data of the first field device are retrieved by an XOR operation of the check sum with the data stored in the second field device and the data of the second field device are retrieved by an XOR operation of the check sum with the data stored in the first field device. If a field device fails, then its data can be retrieved in simple manner from one of the other field devices.

In a preferred embodiment of the method of the present disclosure, it is provided that the read data, in each case, represent at least one parameter value of a field device. Apart from parameter values, in principle, also data collected by the field device, such as, for example, process values, diagnostic data and/or actuating values, can be stored, in case these are required. In general, the system of the present disclosure can thus be used for saving and reproducing memory ranges, which can be used differently.

In an especially preferred embodiment of the method of the present disclosure, it is provided that, in the case of storing the check bit sequences, those check bit sequences, which contain redundant bit sequences, are not stored. In such case, the check bit sequences are so assembled that each data bit sequence is contained only once.

In an especially advantageous, first variant of the method of the present disclosure, it is provided that the method steps are performed after each replacement of one of the field devices. Furthermore, it can be provided that the method steps are performed after each change of the field devices in the plant, for example, in the case of adding a new field device, or in the case of removal of a field device.

In an especially advantageous, second variant of the method of the present disclosure, it is provided that the method steps are performed after each parametering and/or configuring of at least one of the field devices. In this way, it is assured that the data of the additional field devices stored in the field devices are always current. Furthermore, regular time intervals can be defined, in which the method steps are performed. Also, an option is that a user initiates the method steps.

Furthermore, the present disclosure is achieved by a system for performing the method of the present disclosure, comprising:
a plurality of field devices, wherein each of the field devices has a memory module, in which are stored the field device's own data as well as check bit sequences formed from data of the additional field devices; and
a logic unit with a read unit, which is embodied for reading the data of the field devices in the form of data bit sequences,
with a computing unit, which is embodied for combining the read data bit sequences by means of an XOR function to form check bit sequences, and
with a transfer unit, which is embodied for transferring the check bit sequences to the field devices.

In a first advantageous variant of the system of the present disclosure, it is provided that the logic unit is located in at least one of the plurality of field devices. In such case, it can be provided that the logic unit is integrated into the electronics unit of the field device, or is operated by such.

A field device can be updated for application in the system of the present disclosure, should it not have the functionality of the logic unit. This can be provided, for example, by an updating of the firmware, or also by a hardware upgrade, for example, by adding an additional electronics unit, which has the logic unit, especially by a plug-in module.

In a second advantageous variant of the system of the present disclosure, it is provided that the logic unit is located in the control plane of the plant, especially in a control unit or in a computer unit. Since field devices are also currently frequently still operated in the two conductor mode, i.e. draw their energy especially from a 4-20 mA electrical current loop, the computing power of field devices is frequently quite low due to the small available electrical energy.

The computer unit is especially a work station-PC. The control unit is especially a programmable logic controller. Furthermore, there can be connected to the communication network a mobile unit, in which the logic unit is located. The handheld servicing device is especially a mobile end device, such as a smart phone or a tablet; it can, however, also be a laptop or a handheld servicing device, such as especially the "Field Xpert", which is produced and sold by the applicant.

A preferred embodiment of the system of the present disclosure provides that the field devices are connected for communication by means of a wired or wireless communication network. In principle, in such case, any usual protocol of a wired network, especially a fieldbus network of automation technology, such as Foundation Fieldbus®, Profibus®, Profinet®, HART®, ModBus®, Industrial Ethernet, etc., can be used. It can, however, also be a Local Area, or Wide Area, Network, especially the Internet. Examples of wireless networks are Bluetooth, ZigBee, WLAN, GSM, LTE, UMTS, or, however, also a wireless version of a fieldbus protocol, especially wireless HART.

BRIEF DESCRIPTION OF THE DRAWINGS

The present disclosure will now be explained in greater detail based on the appended drawing, the figures of which show as follows.

DETAILED DESCRIPTION

Figure 1:
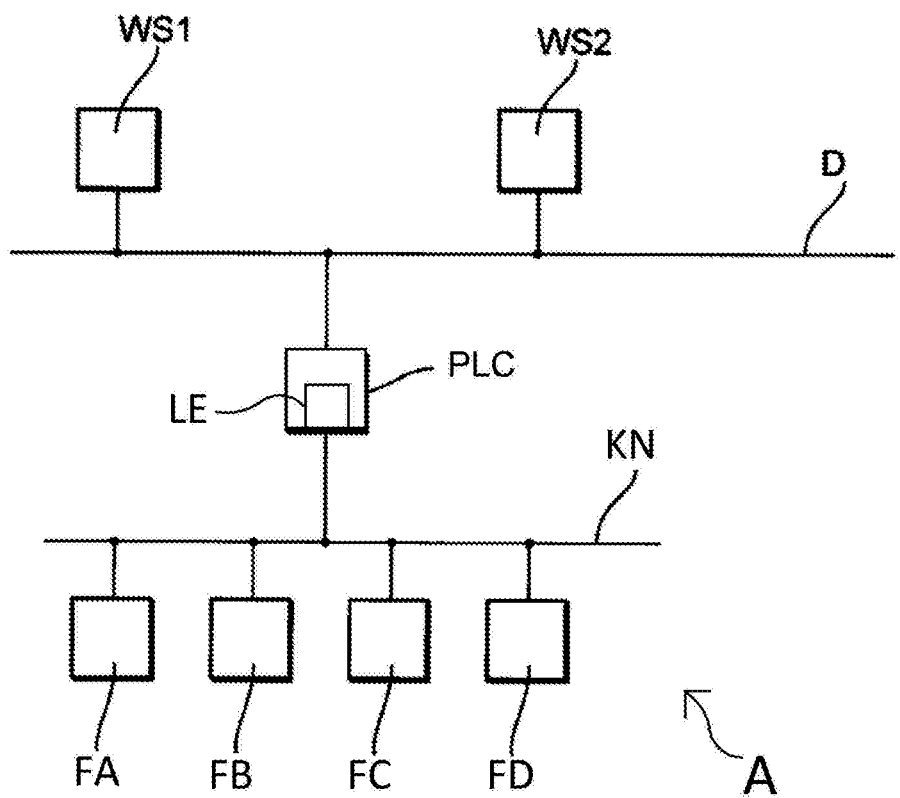
FIG. 1 shows an example of an embodiment of the system of the present disclosure.

FIG. 1 shows an example of an embodiment of the system of the present disclosure.

In such case, a plant A of automation technology is represented. Connected to a data bus D are a number of computer units WS1, WS2 in the form of work station-PCs of the control plane of the plant A. These computer units serve as superordinated units (control system, or control units), among other things, for process visualizing, process monitoring and for engineering, as well as for servicing and monitoring of field devices. The data bus D works e.g. according to the Profibus DP standard or according to the HSE (High Speed Ethernet) standard of Foundation Fieldbus. Via a control unit PLC, which is especially embodied as a programmable logic controller, the control plane of the plant A is connected with a number of field devices FA, FB, FC, FD. The connection of the control unit with the field devices FA, FB, FC, FD occurs via a fieldbus KN, via which the field devices FA, FB, FC, FC are also connected with one another. The field devices FA, FB, FC, FD can be both sensors, as well as also actuators. The fieldbus KN works according to one of the known fieldbus standards, e.g. Profibus, Foundation Fieldbus or HART. Instead of the fieldbus, any other wireless or wired communication network KN can be used. Located in the control unit PLC is a logic unit LE, which controls and executes the method of the present disclosure. Alternatively, the logic unit is located in one of the workstation-PCs WS1, WS2.

Figure 2:
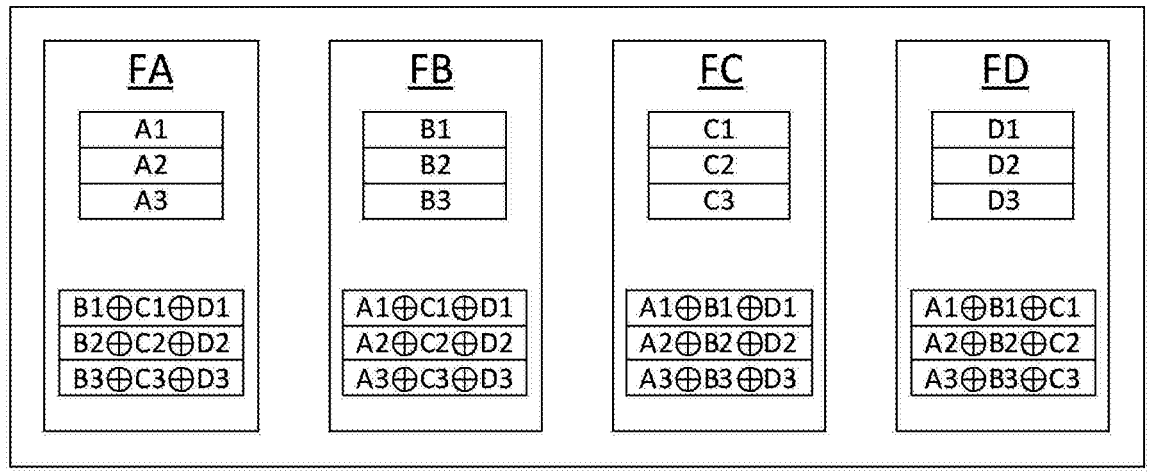
FIG. 2 shows a first example of an embodiment of the method of the present disclosure.

FIG. 2 shows a first example of an embodiment of the method of the present disclosure. Stored in each of the field devices FA, FB, FC, and FD are data in the memory units of the field devices. In the method of the present disclosure, these data are data bit sequences A1, . . . , A3, B1, . . . D3, i.e. sequential arrangements of bits with the binary values 1 and 0. Field device FA possesses in this example of an embodiment three stored data bit sequences A1, A2, A3. The additional field devices FB, FC, FD have analogously, in each case, three data bit sequences B1, B2, B3, . . . D3. The data bit sequences represent in this example of an embodiment parameter values of the field devices.

In a first method step, the logic unit reads the data bit sequences of the field devices FB, FC, FD. These data bit sequences are, in each case, combined with one another via XOR operations.

The data bit sequence B1 represents e.g. the numerical value 10, in the binary manner of writing, 00001010. The data bit sequence C1 represents e.g. the numerical value 19, in the binary manner of writing, 00010011. The data bit sequence D1 represents e.g. the numerical value 217, in binary manner of writing, 11011001.

First, the data bit sequence B1 and the data bit sequence C1 are combined with one another via XOR operations. In such case, are the corresponding locations of the data bit sequences B1 and C1 undergo XOR operations:

| position | 1 | 2 | 3 | 4 | 5 | 6 | 7 | 8 |
|---|---|---|---|---|---|---|---|---|
| B1 | 0 | 0 | 0 | 0 | 1 | 0 | 1 | 0 |
| C1 | 0 | 0 | 0 | 1 | 0 | 0 | 1 | 1 |
| Result | 0 | 0 | 0 | 1 | 1 | 0 | 0 | 1 |

The result of the XOR operation on the data bit sequence B1 and the data bit sequence C1 becomes, thus, 00011001. This result is now, in turn, combined with the data bit sequence D1 via an XOR operation. This result, also referred to as a check bit sequence, becomes 11000000, or 192 in the decimal manner of writing.

Procedure with the other data bit sequences B2, B3, C2, C3, D2, D3 read from the field devices FB, FC and FD is the same, so that at the end three check bit sequences have been calculated, which are stored in the memory unit of the field device FA.

In case the lengths of two data bit sequences to be combined differ, zeros are added to the shorter data bit sequence, until the data bit sequences have identical lengths.

Procedure is analogous with the remaining field devices FB, FC, FD. In the case of field device FB, the data bit sequences of the field devices FA, FC and FD are read, combined and the particular check bit sequences stored. In the case of field device FC, the data bit sequences of the field devices FA, FB and FD are read, combined and the particular check bit sequences stored. In the case of field device FD, the data bit sequences of the field devices FA, FB and FC are read, combined and the particular check bit sequences stored.

Instead of having to store each data bit sequence A1, . . . , A3, B1, . . . D3, in each of the field devices FA, FB, FC, FD, only the corresponding check bit sequences are stored. The required memory requirement is thereby significantly reduced.

If an unequal number of data bit sequences are present in the field devices FA, FB, FC, FD, then first the greatest number of data bit sequences located in a field device FA, FB, FC, FD is determined. Thereafter, the other field devices FA, FB, FC, FD are provided with bit sequences with the value 0 and the method of the present disclosure continued.

In the case, in which field device FD fails, such must be replaced with a substitute field device. This substitute field device should receive the same parameter values, thus the data bit sequences D1, D2, D3, that were in the original field device FD. Due to an electronic defect, the parameter values are, however, no longer capable of being read out from the original field device FD.

This shows a further great advantage of the method of the present disclosure. Since, for example, in the field device FA check sums were calculated from the data bit sequences D1, D2, D3 with the data bit sequences B1, B2, B3, C1, C2, C3 of the field devices FB and FC, the data bit sequences D1, D2, D3 can be retrieved from these check sums using knowledge of the data bit sequences B1, B2, B3, C1, C2, C3 of the field devices FB and FC:

The check bit sequence of the data bit sequences B1, C1, D1 becomes 11000000. This is first combined with the data bit sequence B1, 00001010, by an XOR operation. The result, 11001010, is then combined with the data bit sequence C1, 00010011, by an XOR operation. The result becomes 11011001, which corresponds to the data bit sequence D1. Analogously, the additional data bit sequences D2 and D3 are retrieved.

Figure 3:
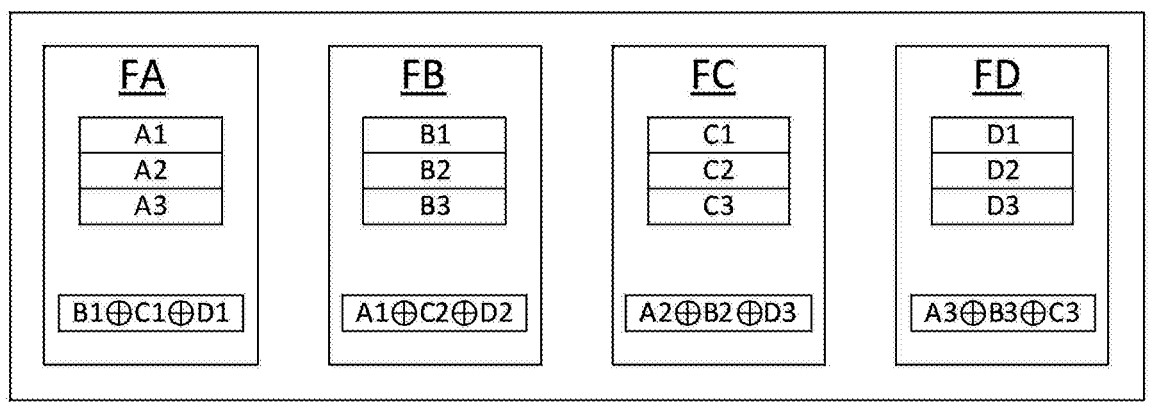
FIG. 3 shows a second example of an embodiment of the method of the present disclosure.

FIG. 3 shows a second example of an embodiment of the method of the present disclosure. As described for FIG. 2, the data bit sequences of the respective field devices FA, FB, FC, FD are combined to check bit sequences. Certain data bit sequences of a field device FA, FB, FC, FD are now, however, distributed redundantly in the field devices FA, FB, FC, FD. For example, the data bit sequence D1 is located XOR-combined in the field devices FA, FB and FC.

The check sums are now assembled in such a manner that each data bit sequence is contained in only one check sum, which is stored in one of the field devices FA, FB, FC, FD, such as shown in FIG. 3. A retrieval of an individual data bit sequence is, in this manner, always still, at any time, possible. The great advantage, in such case, is that, in contrast to the example of an embodiment described with regard to FIG. 2, further memory capacity can be reduced in the respective field devices FA, FB, FC, FD.

Of course, the method of the present disclosure and the system of the present disclosure are applicable for any type and number of field devices FA, FB, FC, FD and not limited to the examples of embodiments shown in the figures, FIG. 1, and FIGS. 2 and 3.

The invention claimed is:

1. A method for a distributed storing of information in a plant of process automation having a plurality of field devices, comprising:
    reading a first data bit sequence from a first field device and a second data bit sequence from a second field device, using a logic unit;
    combining the first data bit sequence with at least the second data bit sequence using an XOR function executed by the logic unit to form a first check bit sequence, wherein in the first check bit sequence each position corresponds to an XOR operation of corresponding locations of the first data bit sequence and the second data bit sequence; and
    storing the first check bit sequence in a third field device,
    wherein the reading of data bit sequences, the combining of data bit sequences using an XOR function to form additional check bit sequences, and the storing of additional check bit sequences is repeated for additional field devices of the plurality of field devices, and
    wherein a data bit sequence is contained in only one check bit sequence.

2. The method as claimed in claim 1, wherein the first data bit sequence represents at least one parameter value of the first field device and the second data bit sequence represents at least one parameter value of the second field device.

3. The method as claimed in claim 1,
    wherein the reading of data bit sequences, the combining of data bit sequences using an XOR function to form additional check bit sequences, and the storing of additional check bit sequences is repeated for additional data bit sequences in the first field device and in the second field device, and
    wherein when storing the first and additional check bit sequences, check bit sequences that contain redundant data bit sequences are not stored.

4. The method as claimed in claim 1, wherein the method steps are performed after a replacement of one of the field devices.

5. The method as claimed in claim 1, wherein the method steps are performed after a parametering and/or a configuring of at least one of the field devices.

6. A method for a retrieval of distributed data, comprising:
    reading with a logic unit a check bit sequence from a first field device, wherein the check bit sequence is a result of a bit-wise XOR operation of at least a first data bit sequence from a second field device and a second data bit sequence from a third field device;
    reading with the logic unit the first data bit sequence from the second field device;
    padding the first data bit sequence with 0 bits to a length of the check bit sequence if the first data bit sequence is shorter than the check bit sequence;
    performing with the logic unit a bit-wise XOR operation of the first data bit sequence and the check bit sequence to produce the second data bit sequence;
    storing with the logic unit the second data bit sequence in the third field device; and
    converting the second data bit sequence in the third device to at least one parameter value in the third field device.

7. A system for a distributed storing of information, comprising:
    a plurality of field devices, each of the plurality of field devices having a memory module embodied to store the field device's own data and to store at least one check bit sequence formed from data of the plurality of field devices; and
    a logic unit including:
        a read unit embodied to read a first data bit sequence from a first field device of the plurality of field devices and a second data bit sequence from a second field device of the plurality of field devices;
        a computing unit embodied to combine the first data bit sequence with the second data bit sequence using an XOR function to form a first check bit sequence, wherein in the first check bit sequence each position corresponds to an XOR operation of corresponding locations of the first data bit sequence and the second data bit sequence; and
        a transfer unit embodied to transfer the first check bit sequence to a third field device of the plurality of field devices,
    wherein the reading of data bit sequences, the combining of data bit sequences using an XOR function to form additional check bit sequences, and the storing of additional check bit sequences is repeated for additional field devices of the plurality of field devices, and
    wherein a data bit sequence is contained in only one check bit sequence.

8. The system as claimed in claim 7, wherein the logic unit is located in at least one of the plurality of field devices.

9. The system as claimed in claim 7, wherein the logic unit is disposed in a control plane of a plant, in a programmable logic control unit, or in a computer unit.

10. The system as claimed in claim 7, wherein the field devices are connected for communication by a wired or wireless communication network.

* * * * *